US008587771B2

(12) United States Patent
Xu et al.

(10) Patent No.: US 8,587,771 B2
(45) Date of Patent: Nov. 19, 2013

(54) METHOD AND SYSTEM FOR MULTI-PHASE DYNAMIC CALIBRATION OF THREE-DIMENSIONAL (3D) SENSORS IN A TIME-OF-FLIGHT SYSTEM

(75) Inventors: Zhanping Xu, Sunnyvale, CA (US); Travis Perry, Palo Alto, CA (US); Gage Hills, Mill Valley, CA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 13/092,350

(22) Filed: Apr. 22, 2011

(65) Prior Publication Data

US 2012/0013887 A1     Jan. 19, 2012

Related U.S. Application Data

(60) Provisional application No. 61/365,284, filed on Jul. 16, 2010.

(51) Int. Cl.
*G01C 3/08*     (2006.01)
(52) U.S. Cl.
USPC ........... 356/4.02; 356/3.01; 356/4.01; 356/72
(58) Field of Classification Search
USPC .................. 356/3.01, 4.01, 4.02, 72
See application file for complete search history.

(56) References Cited

U.S. PATENT DOCUMENTS

| 6,580,496 | B2 | 6/2003 | Bamji et al. |
| 6,697,010 | B1 | 2/2004 | Lam |
| 7,719,662 | B2 | 5/2010 | Bamji et al. |
| 2007/0127009 | A1 | 6/2007 | Chen et al. |
| 2008/0180650 | A1 | 7/2008 | Lamesch |
| 2009/0237640 | A1 | 9/2009 | Krikorian et al. |

FOREIGN PATENT DOCUMENTS

| EP | 2116864 A1 | 11/2009 |
| EP | 2157401 A1 | 2/2010 |

OTHER PUBLICATIONS

Office Action dated May 14, 2013, in Chinese Patent Appl. No. 201110206379.8.
Amendment dated Feb. 28, 2013, in Chinese Patent Appl. No. 201110206379.8.
European search report dated Apr. 17, 2013, in European Patent Appl. No. 11807282.6.
Office Action dated Nov. 2, 2012, in Chinese Appl. No. 201110206379.8.
International Search Report & The Written Opinion of the International Searching Authority dated Dec. 22, 2011, International Application No. PCT/US2011/042643.
Response to Office Action dated Jul. 29, 2013, Chinese Patent Application No. 201110206379.8.
English translation of Amended Claim filed in Response to Office Action dated Jul. 29, 2013, Chinese Patent Application No. 201110206379.8.

*Primary Examiner* — Isam Alsomiri
*Assistant Examiner* — Samantha K Abraham
(74) *Attorney, Agent, or Firm* — Vierra Magen Marcus LLP

(57) ABSTRACT

A phase-based TOF system preferably generates an optical waveform with fast rise and fall times, to enhance modulation contrast, notwithstanding there will be many high order harmonics. The system is preferably operated with an odd number of phases, to reduce system bias error due to the higher order harmonics, while maintaining good modulation contrast, without unduly increasing system memory requirements. Preferably the system can dynamically calibrate (and compensate for) higher order harmonics in the TOF generated optical energy waveform, over time and temperature. Within the optical energy transmission channel, or within the optical energy detection channel, detection amplifier gain may be modified, and/or detector signal integration time may be varied, and/or digital values may be employed to implement calibration and error reduction The resultant TOF system can operate with improved phase-vs-distance characteristics, with reduced calibration requirements.

22 Claims, 12 Drawing Sheets

FOUR-PHASE - MODULATION PERIOD/DISTANCE

FOUR-PHASE - MODULATON PERIOD/DISTANCE

FOUR-PHASE - MODULATON PERIOD/DISTANCE

POLAR PLOT - FOUR PHASE HARMONICS

FOUR-PHASE HARMONICS - MODULATION PERIOD/DISTANCE

ACTIVE BRIGHTNESS - MODULATION PERIOD/DISTANCE
(FOUR-PHASE)

POLAR PLOT - FIVE PHASE HARMONICS

PHASE HARMONICS - MODULATION PERIOD/DISTANCE
(FIVE-PHASE)

ACTIVE BRIGHTNESS - MODULATION PERIOD/DISTANCE
(FIVE-PHASE)

POLAR PLOT – SEVEN PHASE HARMONICS

PHASE HARMONICS – MODULATION PERIOD/DISTANCE
(SEVEN-PHASE)

ACTIVE BRIGHTNESS – MODULATION PERIOD/DISTANCE
(SEVEN-PHASE)

METHOD AND SYSTEM FOR MULTI-PHASE DYNAMIC CALIBRATION OF THREE-DIMENSIONAL (3D) SENSORS IN A TIME-OF-FLIGHT SYSTEM

RELATION TO CO-PENDING APPLICATION

Priority is claimed from U.S. provisional patent application Ser. No. 61/365,284, filed 16 Jul. 2010, entitled "Method and System for Multi-Phase Dynamic Calibration of Three-Dimensional (3D) Sensors in a Time-of-Flight System", which application was originally assigned to Canesta, Inc. of Sunnyvale, Calif., and is now assigned to Microsoft, Inc. of Redmond, Wash.

BACKGROUND OF THE INVENTION

Three-dimensional (3D) cameras based on time-of-flight (TOF) principle acquire distance information from object(s) in a scene being imaged. Distance information is produced independently at each pixel of the camera's sensor array. Exemplary such systems are described in U.S. Pat. No. 6,323,942 "CMOS-Compatible Three-Dimensional Image Sensor IC" (2001), and U.S. Pat. No. 6,515,740 "Methods for CMOS-Compatible Three-Dimensional Image Sensing Using Quantum Efficiency Modulation" 2003, which patents were originally assigned to Canesta, Inc., and are now assigned to Microsoft, Inc.

As described in U.S. Pat. No. 6,323,942, a TOF system emits optical energy (active optical energy) and determines how long it takes until at least some of that energy, reflected by a target object, arrives back at the system to be detected by the array of sensors. Emitted optical energy traversing to more distant surface regions of a target object before being reflected back toward the TOF system will have a longer TOF than if the target object were closer to the system. If the roundtrip TOF time is denoted $t_1$, then the distance between target object and the TOF system is $Z_1$, where $Z_1 = t_1 \cdot C/2$, where C is velocity of light. Such systems can acquire both luminosity data (signal amplitude) and TOF distance, and can realize three-dimensional images of a target object in real time. Advantageously such systems can operate with or without ambient light (passive optical energy), and can operate without moving parts, for example, shutters, motors.

A more sophisticated TOF system is described in U.S. Pat. No. 6,515,740, wherein TOF is determined by examining relative phase shift between modulated transmitted light signals and light signals reflected from a target object. FIG. 1A depicts an exemplary phase-shift detection system 100 according to the '740 patent. Detection of the reflected light signals over multiple locations in the system pixel array results in measurement signals that are referred to as depth images. The depth images represent a three-dimensional image of the target object surface.

Referring to FIG. 1A, TOF system 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 may also include a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, a source of optical energy 120 is periodically energized via exciter 115, and emits optical energy via lens 125 toward an object target 20. Typically the optical energy is light, for example emitted by a laser diode, VCSEL (vertical-cavity surface emitting laser) or LED device 120. Some of the optical energy emitted from device 120 will be reflected off the surface of target object 20, and will pass through an aperture field stop and lens, collectively 135, and will fall upon two-dimensional array 130 of pixel detectors 140 where an image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined. Advantageously system 100 can be implemented on a single IC 110, with relatively few off-chip components.

Typically optical energy source 20 emits preferably low power (e.g., perhaps 1 W peak) periodic waveforms, producing optical energy emissions of known frequency (perhaps 30 MHz to a many hundred MHz) for a time period known as the shutter time (perhaps 10 ms). Optical energy from emitter 120 and detected optical energy signals within pixel detectors 140 are synchronous to each other such that phase difference and thus distance Z can be measured for each pixel detector. The detection method used is referred to as homodyne detection in the '740 and '496 patents. Phase-based homodyne detection TOF systems are also described in U.S. Pat. No. 6,906,793, Methods and Devices for Charge Management for Three-Dimensional Sensing, originally assigned to Canesta, Inc., and now assigned to Microsoft, Inc., assignee herein. Applicants incorporate said '793 patent herein by reference.

The optical energy detected by the two-dimensional imaging sensor array 130 will include light source amplitude or intensity information, denoted as "A", as well as phase shift information, denoted as $\phi$. As depicted in exemplary waveforms in FIGS. 1B and 1C, the received phase shift information (FIG. 1C) varies with TOF and can be processed to yield DATA, including Z data. For each pulse train of optical energy transmitted by emitter 120, a three-dimensional image of the visible portion of target object 20 is acquired, from which intensity and Z data is obtained (DATA). As described in U.S. Pat. Nos. 6,515,740 and 6,580,496 obtaining depth information Z requires acquiring at least two samples of the target object (or scene) 20 with 90° phase shift between emitted optical energy and the pixel detected signals. While two samples is a minimum figure, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data. Further details as to implementation of various embodiments of phase shift systems may be found in U.S. Pat. Nos. 6,515,740 and 6,580,496.

FIG. 1D is similar to what is described with respect to the fixed phase delay embodiment of FIG. 10 in U.S. Pat. No. 6,580,496, entitled Systems for CMOS-Compatible Three-Dimensional Image Sensing Using Quantum Efficiency Modulation, or in U.S. Pat. No. 7,906,793, entitled Methods and Devices for Charge Management for Three-Dimensional Sensing, both patents originally assigned to Canesta, Inc., and now assigned to Microsoft, Inc., assignee herein. (Applicants incorporate the '496 and the '793 patents herein by reference.) In FIG. 1D, generated photocurrent from each quantum efficiency modulated differential pixel detector, e.g., 140-1, is differentially detected (DIF. DETECT) and differentially amplified (AMP) to yield signals $B \cdot \cos(\phi)$, $B \cdot \sin(\phi)$, where B is a brightness coefficient.

During normal run-time operation of the TOF system, a fixed 0° or 90° phase shift delay (DELAY) is switchably insertable responsive to a phase select control signal (PHASE SELECT). Homodyne mixing occurs using quantum efficiency modulation to derive phase difference between transmitted and received signals (see FIGS. 1B, 1C), and to derive TOF, among other data. A more detailed description of homodyne detection in phase-based TOF systems is found in the '496 patent. Although sinusoidal type periodic waveforms are indicated in FIG. 1D, non-sinusoidal waveforms may instead be used. Detection configurations similar to FIG. 1D may be used with embodiments of the present invention.

Thus, TOF systems as exemplified by FIG. 1A can acquire phase delay ($\phi$) between the modulated transmitted light and target object-reflected light. While phase $\phi$ is proportional to the (Z) distance separating the TOF sensor array and the target object, phase delay is a relative quantity and is not per se equal to Z distance. For example as Z increases, phase $\phi$ increases, but after an increase of 360°, the phase folds-over and further increases in Z will produce further increases in $\phi$, again starting from 0°. In practice, one generally provides TOF systems with the ability to disambiguate or de-alias the phase data to obtain a true measure of Z.

As exemplified by U.S. Pat. No. 7,719,662 originally assigned to Canesta, Inc., and now assigned to Microsoft, Inc., assignee herein, it is beneficial to further provide a TOF system with a calibration method enabling use of Cartesian (or real world X, Y, Z) coordinates instead of radial information. (TOF pixels or sensors measure phase delay along a certain radial angle that is different for each pixel 140 in array 130.) According to the '662 patent, one function of calibration may be defined as creating a mapping from sensor 140 response to geometrical coordinates, which are X, Y, and Z information with respect to a known reference. (X and Y coordinates are the horizontal and vertical offsets from the optical axis of the TOF system, and Z is the perpendicular distance between the sensor and the target object or object within an imaged scene.) Such mapping may include depth calibration as well as XY calibration. The '662 patent disclosed calibration mapping methods that did not require gathering depth data at different values of Z, as a target object was physically relocated to the different Z depths in the XY plane (the so-called "by example" method). Data so gathered could be collected and stored in a look-up-table (LUT) that was available to the TOF system during run time operation to make corrections in acquired depth data.

In addition to geometrical calibration, one must perform other types of calibration to account for certain environmental factors, including without limitation temperature and ambient lighting conditions. For example, temperature changes in sensor array 130 can increase so-called dark current in pixels 140, which dark current can in turn change measured phase $\phi$. Ambient light can interfere with system-emitted light from source 120, and can result in phase errors. A complete calibration procedure preferably will include steps to model the effects of such environmental changes. So doing can allow these effects to be removed dynamically during run-time operation, when the environmental conditions may change.

Thus, a given phase response from the sensor array is converted to distance by interpolating the values stored in the calibration table. However the phase-vs-distance transfer function curve contains harmonics and sufficient data points must be stored in the calibration table to model these harmonics to avoid loss of accuracy due to insufficient sampling. There is also interpolation error that can only be reduced by increasing the size of the table.

Although the "by-example" method is straightforward to implement with relatively fast run-time processing, it has several disadvantages. Taking a subset of the operating range and subsequent interpolation results in errors that can be several cm in magnitude. Further, as the operating range of the sensor is increased, more data must be stored in the calibration table to maintain accuracy. This generates larger calibration tables, requiring more storage, as well as longer interpolation times. Storage can be on the order of several MB, e.g., very large for use with embedded systems. Another problem from a practical standpoint is the large physical space needed to capture data from the sensor for large field of view (FOV) and operating ranges as the target object is repositioned. For example, a sensor with a 100° FOV and 5 m operating range requires a target object of approximately 12 m×12 m, which target object must be moved between 0 and 5 m during calibration. Given enough physical space for target object relocation during calibration, and given enough time for the calibration procedure, such prior art "by example" calibration can be carried out. But such prior art calibration procedure has high costs and is not very suitable for calibrating a high-volume product.

Statically storing calibration correction terms in a lookup table (LUT) has been a traditional approach to calibration. However LUT coefficient values that were created when a TOF system was new, may no longer provide good calibration correction as the TOF system ages, or individual components change, e.g., with temperature. Further storing LUT values can increase system memory storage overhead.

U.S. Pat. No. 7,719,662 addressed several efficient methods and systems to implement detected phase to distance calibration for three-dimensional camera systems. The '662 patent described methods and systems requiring less time and smaller physical space to be carried out. However further improvement is generally desirable.

There are tradeoffs in any TOF system design. On one hand, emitting optical energy waveforms that are square-waves advantageously enhances modulation contrast but the fast rise and fall times that characterize square-waves contribute to undesired high order harmonics.

What is needed are methods and systems to reduce error due to harmonic content in the phase-based data acquired by a TOF system, sometimes referred to as bias error. Preferably such methods and systems would advantageously enable high modulation contrast associated with emitted square-wave optical energy waveforms, while compensating for the bias error attendant with the higher order harmonics that accompany such waveforms. Changes in bias error can result from variations in the waveform of the emitted optical energy due to time and temperature. It then becomes necessary or at least desirable to compensate for change in bias error by changing the calibration requirements for the TOF system. Preferably such methods and systems should be operable dynamically without increasing, and preferably by decreasing, memory requirements, while preserving high modulation contrast. Implementation of such methods and systems would provide dynamically good calibration of TOF systems with enhanced linearity even over varying system and/or environmental conditions.

The present invention provides such methods and systems.

SUMMARY OF THE INVENTION

Modern TOF systems typically acquire Z depth data using multiple phase shifting, for example acquiring depth data using four phase shifts 0°, 90°, 180°, 270° of the modulation frequency of the emitted optical energy. Fast calibration according to some systems provided calibration modeling for a TOF system, with corrective parameters stored in a lookup table, and also provided for a phase offset correction. However as the TOF system aged or system changes, e.g., thermal changes, the effectiveness of the stored corrective modeling data could be impaired. By contrast, embodiments of the present invention can dynamically calibrate a TOF system without using the typically static modeling of prior art TOF systems.

The present invention recognizes that operating a phase-based TOF system with a preferably odd number of phase shifts, e.g., N=3, N=5, N=7, etc., rather than an even number of phases, e.g., N=4, N=6, etc., advantageously reduces bias error from high order harmonics that contribute substantially to TOF system non-linearity. Such bias error correction or compensation has not been explicitly provided for in prior art TOF systems. In addition, using an odd number of phase shifts advantageously can maximize modulation contrast (a measure of sensor detector efficiency). The present invention enables the TOF system to emit square-wave shaped optical energy, which waveform desirably promotes enhanced high modulation contrast, but is undesirably rich in high order harmonics. However bias error from these high order harmonics is reduced according to embodiments of the present invention. Further, storage requirements for correction data are advantageously reduced, e.g., with two banks of memory being sufficient to store correction data, even when the number of phases is substantially greater than three. Overall, better calibration correction is achieved dynamically, while preserving if not enhancing modulation contrast, without increase in storage overhead. Such calibration correction includes dynamic compensation for bias error components including phase-distance measurement changes in the TOF system emitted optical waveform over time, and over temperature. Embodiments of the present invention can combine use of odd phase shifts with look-up tables (LUT) to further enhance TOF system performance. If used optionally, the LUT preferably stores corrective data to make fine corrections that can further reduce residual bias error from high order harmonics. Aspects of the present invention may be implemented software and/or hardware.

Other features and advantages of the invention will appear from the following description in which the preferred embodiments have been set forth in detail, in conjunction with their accompanying drawings.

DETAILED DESCRIPTION OF THE PREFERRED EMBODIMENT

As noted, obtaining reliably accurate depth Z data from a TOF system requires that the calibration characteristics of the TOF system be known during runtime operation of the system. Some TOF characteristics can be obtained a priori using so-called "by example" calibration techniques. U.S. Pat. No. 7,719,662 described an improved method of calibration during which the target object remains stationary but phase is injected into the modulation frequency of the emitted optical energy to emulate distance-caused phase. Such calibration was fast and did not require a large room in which to acquire the data. Calibration models including electrical (phase vs. distance characteristics that depend upon electrical rather than geometric characteristics of the sensing system) and elliptical (phase vs. distance characteristics that depend upon geometric rather than electrical characteristics of the sensing system) were constructed and stored.

But TOF characteristics tend to be dynamic rather than static over time, and over environmental changes, e.g., temperature changes. Thus, stored calibration model data that might be very accurate when the TOF system is new (and freshly calibrated) can become less accurate due to system changes including temperature changes upon the TOF system.

The present invention provides a multi-phase dynamic calibration method and system to obtain and maintain good linear calibration data during runtime operation of a TOF system.

Figure 1A:
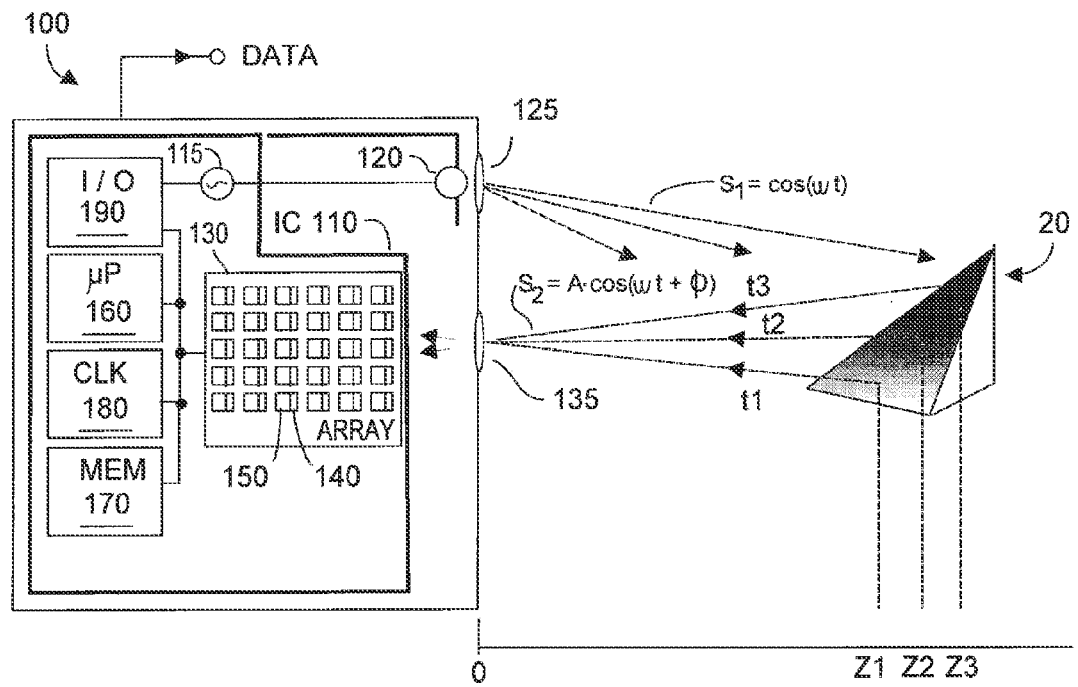
FIG. 1A is a block diagram depicting a phase-phased, three-dimensional time-of-flight imaging system as exemplified by U.S. Pat. No. 6,515,740, according to the prior art.
Figure 1B:
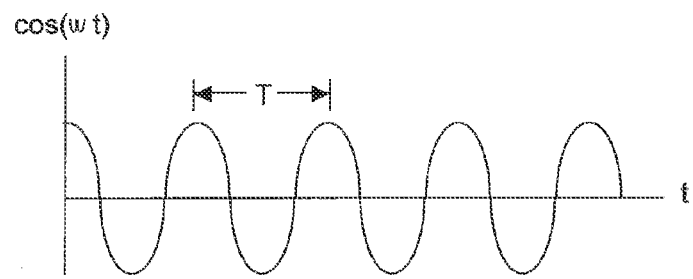
FIGS. 1B and 1C depict exemplary waveform relationships for the block diagram of FIG. 1A, according to the prior art.
Figure 1C:
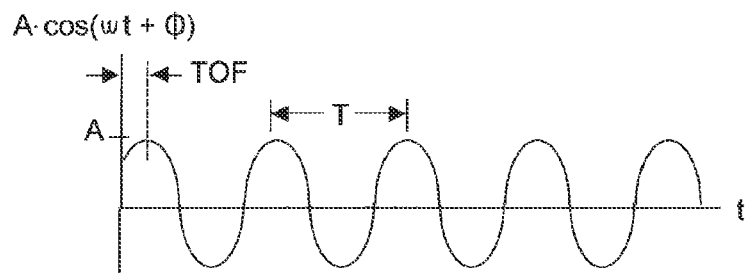
Figure 1D:
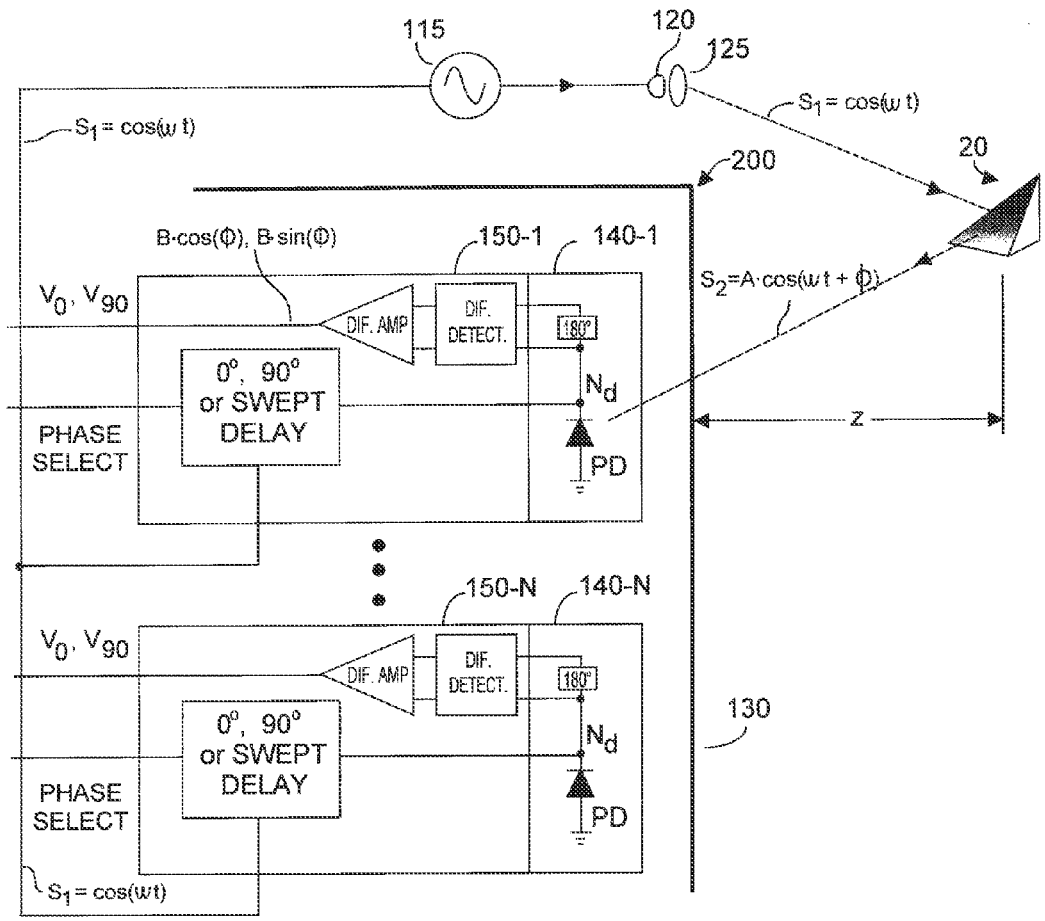
FIG. 1D is a block diagram depicting exemplary differential photodetectors and associated electronics in a fixed-phase delay (FPD) quantum efficiency modulated detector, according to the prior art.
Figure 2:
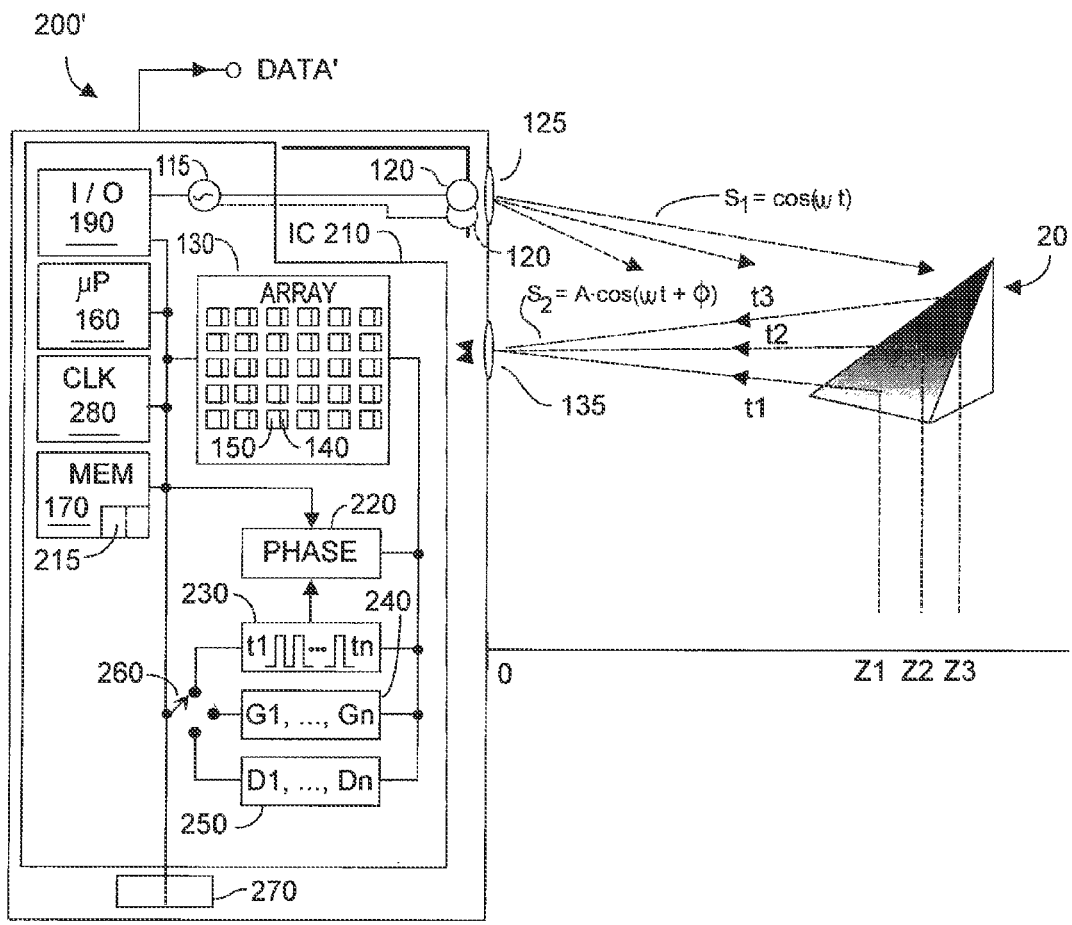
FIG. 2 depicts a TOF system provided with dynamically selectable multiple phase shift calibration enabling any or all of multiple phase shift calibration with gain modulation, with integration time modulation, and/or with digital operation including optional look-up table (LUT) implementation for even finer correction of residual error due to high order harmonics, according to embodiments of the present invention.

FIG. 2 depicts a TOF system 200 whose memory 170 stores, among other data, a routine that upon execution, e.g., by an on-chip processor such as 160 or an off-chip processor, carries out embodiments of the present invention. (Unless noted otherwise, components and systems in FIG. 2 bearing similar reference element numerals as in FIG. 1A may be considered to be the same or substantially same.) Further, memory 170 region 215 may be used to store data created by embodiments of the present invention, or such data may be stored off-IC chip 210, e.g., in off-ship memory 270. Note that system 200' in FIG. 2 may use multiple optical sources 120. Memory region 170 may also store at least one look-up table (LUT) used by the present invention. Optionally the LUT can store corrective data, including dynamically gathered corrective data, to enable finer correction of even the small residual errors in the system due to high order harmonics. Embodiments of the present invention may include storage, e.g., 170, 215, etc., for at least one LUT containing corrective coefficients on a per-pixel basis, to further correct harmonic related error.

Fast-Z calibration preferably creates a phase-to-distance mapping with as few data points as possible, in a time-efficient and space efficient manner. To capture the fundamental electronic detection characteristics of system 200, the phase-vs-distance mapping should ideally be linear but in practice will include harmonics, as shown in FIG. 1E. These undesired deviations from linearity are believed due to presence of higher order odd harmonics, as will be described. Embodiments of the present invention seek to dynamically provide a more linear phase-vs-distance transfer function over time and temperature. The result is a TOF system whose depth measurements are less dependent upon precise calibration.

In the present invention, rather than rely upon essentially static corrective data, applicants have discovered that it is advantageous to operate a phase-based TOF system using an odd number of phases, e.g., N=3 (0°, 120°, 240°), N=5 (0°, 72°, 144°, 216°, 288°), N=7, etc. Acquiring TOF data using an odd number of phases advantageously reduces bias error due to ripple-like mal-effects of harmonics, evidenced by FIG. 1E.

Advantageously, good modulation contrast is obtained using embodiments of the present invention, and as few as two banks of memory suffice to store calibration data, independent of magnitude of N. If desired, further reduction in harmonic bias error could be achieved by employing a look-up table (LUT), although in many applications this will not be required. In one embodiment, such LUT preferably stores most recently obtained corrective data, on a dynamic basis, for the TOF system. Use of the LUT is optional but can more optimally correct for residual non-linearities in the TOF system phase-vs-depth distance relationship, to yield finer correction.

Turning again to FIG. 2, a TOF system 200' is in many respects similar to what has been described, e.g., with respect to FIG. 1A, 1B, 1C, 1D, where as noted similar reference numerals may denote substantially similar components or functions. Data acquired by phase-based TOF system 200' is denoted DATA' and may be exported to other applications and/or devices. As shown in FIG. 2, system 200' preferably includes at least one mode or module of operation, denoted 230, 240, 250, where system 200' can operate in at least one of these modes, preferably dynamically switchably. An electronic switch 260 is shown symbolically as enabling system 200 to switch, dynamically or statically, to a desired one of the three modes 230, 240, 250, as best suits the present TOF system runtime operation conditions. System 200 also includes a phase shifter control unit 220 that can cause the modulation frequency of the optical energy from emitter(s) 120 to have a desired phase value.

Figure 1E:
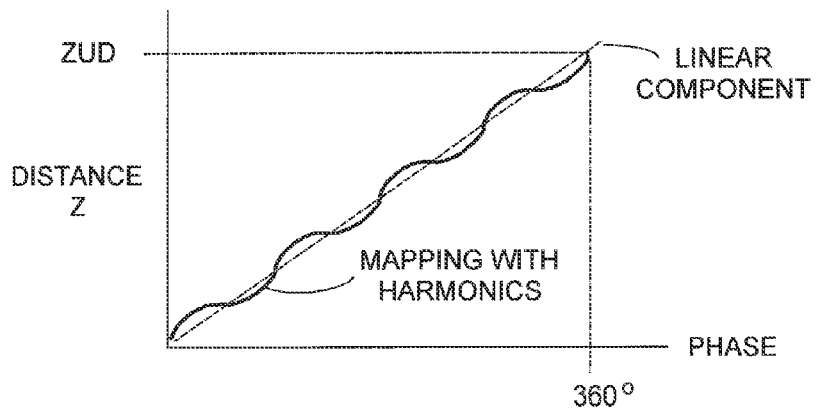
FIG. 1E depicts non-linear harmonic components superimposed upon an idealized linear component for a depth-vs-phase mapping characteristic of a TOF system, according to the prior art.

As noted earlier herein, many prior art TOF systems, e.g., system 100 in FIG. 1A, are operated using four phases, with emitted optical energy having a sinusoidal type waveform. If the waveform were an ideal sinusoid, TOF system 100 would not exhibit non-linear distortion, but in reality, such distortion will exist. For example, a four-phase system will typically produce depth Z values with an error of about ±4° at a certain Z distance, which error is mainly due to higher order harmonics a correlation function (CF) associated with a quasi-triangular waveform. For example, the relative amplitude of harmonics for an ideal triangular shaped CF can be expanded in the frequency domain as $f_1$ 1, $f_2$ 0, $f_3$ 1/9, $f_4$ 0, $f_5$ 1/25, $f_6$ 0, $f_7$ 1/49, and so on, where $f_1$ is the basic frequency applied to the TOF system. Of course in a real system, harmonics of higher order terms will not decrease fully to zero due to non-linear distortion that will be present.

While calibration or compensation methods using typically static LUT(s) can be employed to seek higher depth Z measurement precision, one cannot readily dynamically alter contents of the LUT to meet present TOF system operating conditions. It would be useful if once could, for example, alter LUT contents to address the mal-effects of harmonics of order three or higher in the correlation function (CF), perhaps due to modulation instability, waveform distortion, etc. TOF systems relying upon statically stored LUT corrective calibration values are especially vulnerable to amplitude coefficient changes and/or phase shift changes caused by a dominant third order harmonic, or higher order harmonic.

For example, one can express third order harmonics as $k=m_3 \cdot \cos(3\omega t_d + f_{i0})$ where $m_3$ is a nominal coefficient, $\omega$ is the basic angular frequency of the modulation signal on the optical energy from emitter(s) 120, $t_d$ is the time delay due to the time-of-flight, and $f_{i0}$ is the TOF system phase offset, a parameter indicative of systematic noise, thermal effects, etc. The value k is the dominant term is the system phase offset, which produces system error in a four-phase based TOF system. Coefficient $m_3$ and system phase offset $f_{i0}$ may vary due to wave deformation and/or other variables. Understandably it can be challenging for a pure LUT calibration or correction approach to compensate adequately when magnitude of k varies. A conventional four-phase TOF system can also suffer from sensor or pixel saturation, especially if the target object has strong reflectance. If the target object is in rapid motion, a single frame of acquired depth data may contain blurred images, which is difficult to cure in post processing. Understandably if depth data can be acquired over shorter periods of time, there is relatively less opportunity for blurring, and for pixel saturation within array 130.

Practical design considerations, including economics, may dictate that light source(s) 120 be LEDs, or laser diodes, and that the modulation signal from exciter 115, and the demodulation signal applied to the various pixel detectors 140 in array 130 have rectangular or square waveforms. Such fast rise and fall time waveform signals can enhance TOF system correlation sensitivity, manifested for example by enhanced modulation contrast.

Theoretically, an idealized detector system would exhibit 100% modulation contrast for square-wave waveforms, and 50% modulation contrast for sinusoidal waveforms. But while advantageous from a modulation contrast viewpoint, use of square-waves can result in severe TOF system non-linear distortions, which will reduce absolute precision of system measured Z depth values. As will now be described, embodiments of the present invention advantageously provide reduced harmonic bias error, enhanced modulation contrast, with decreased image blurring and less likelihood of pixel saturation, with decreased requirements for memory storage.

Embodiments of the present invention apply preferably an odd number N of phase-shifting steps to TOF system 200', preferably in the system optical energy transition channel or path, or in the three-dimensional receiving channel or path. For ease of illustration, FIG. 2 depicts embodiments in which phase shifting is shown in the receiving channel or path. Assume that switch 260 is in the horizontal position, e.g., coupled to module 240, a gain modulation coefficient $G_N$ assigning unit. In this mode, the TOF system oscillator unit (e.g., clock 180, processor 160, I/O 190) generates an RF modulation signal via emitter 115 having a modulation frequency f0. This drive signal is coupled to optical energy emitter(s) 120, which emits optical energy that at least partially illuminates a portion of a target object of interest 20. Some of this active energy (active light) is reflected by the target object back towards TOF system 200', where it passes through optical system 135, and falls upon pixel detectors or sensors 140 in array 130. The time duration required for the optical energy to exit system 200', be reflected by target object 20, and be partially returned to TOF system 200' is the time-of-flight or TOF, $t_d$. Electronics such as 150 preferably include functions such as analog/digital conversion, at least one variable gain amplifier, and readout capability, e.g., I/O 190. The RF modulation signal driving exciter 115 and emitter 120 is also coupled simultaneously to phase shifter 220, and is used to demodulate the optical depth image being acquired by the TOF system, through each pixel detector.

Exemplary types of demodulation include quantum efficiency modulation, and homodyne detection; see for example U.S. Pat. No. 6,515,740. When switch 260 is in the center position, the gain of the demodulated signal preferably is variable tuned by coefficient assignment unit 240, which assigns different amplifier gain factors, e.g., gain $G_1$, gain $G_2$, ... $G_N$. The thus gain-modified signal is then digitized, either on IC chip 210, or off-chip, and can be stored on-chip, e.g., in memory 215 or off-chip, e.g., in memory 270. What is stored on or off chip may be regarded as banks of data, preferably one or two banks of data, perhaps in a portion of memory 170, 215, or off-chip in memory 270. Ultimately the processed or preprocessed signal information can be exported as DATA', for use by other devices and/or applications. In a preferred embodiment, the various gains in assignment unit 240 may be variable in amplitude, and can be varied dynamically during run-time operation, to best accommodate the TOF system environment at the moment.

Referring still to FIG. 2, assume now that switch 260 is moved into the uppermost position, coupling to an integration time modifier unit 230. The various $t_1, t_2, \ldots t_N$ entries denote different pixel signal integration times. (Typically detection current generated in a pixel by incoming photon energy is integrated in a capacitor to develop a detectable signal.) In this mode of operation, the integration time of the demodulated detection signal is variably tuned by integration time modifier unit 230, synchronously with each phase shift from phase shift unit 220. Again digitizing of the variable integration time modified detection signals may occur on or off IC chip 210.

Assume now that switch 260 is in the bottommost position, coupled to digital numerical unit 250, which contains digital numerical values denoted $D_1, D_2, \ldots D_N$, which operate synchronously with phase changes from phase unit 220. Data generated may be stored on or off chip, e.g., in memory 170, 215 and/or memory 270.

It is understood that "switch" 230 is an abstract representation and is not a rotatable mechanical physical switch. In a preferred embodiment, switch 230 can switch modes dynamically and on-the-fly between gain modification mode, integration time modification mode, and digital value modification mode, as best suits operation of TOF system 200' at the present runtime in the present working environment. In the variously modes of operation, it is assumed that the N-phase shifts are equal, or at least non-equal distance distributed within or over a period of the associated correlation factor CF. For example, N equally distributed phase shifts result in a phase shift set:

$\{0, 1\cdot 2\pi/N, 2\cdot 2\pi/N, \ldots (k-1)\cdot 2\pi/N)\}$

The initial shift can be any phase value $f_{i0}$ plus any value in the above braces. Each pixel 140 in TOF pixel array 130 (see FIG. 12) will provide output Z depth information corresponding to phase $\phi_d$ as follows:

$$\varphi_d = \operatorname{atan}\left(\frac{-\sum_{k=1}^{N}\left[V'_k \sin\left(\frac{2\pi}{N}*(k-1)\right)\right]}{\sum_{k=1}^{N}\left[V_k \cos\left(\frac{2\pi}{N}*(k-1)\right)\right]}\right)$$

where $V_k$ is pixel output signal at phase steps k=1, 2, 3, ... N, and the sinusoidal terms determine the modification coefficients. This general formulation includes 3, 4, 5 to any integer number of N of phase shifts. Increasing the number of phase shifts will cancel or selectively cancel the unwanted systematic error caused by the higher order harmonics. Expansion of the above a tan function will yield components in the real domain and components in the imaginary domain. Independently of magnitude of N, these two component sets, real and imagery, may be stored in as few as two memory banks, e.g., on-chip memory 215, or off-chip memory 270, for use in runtime calibration corrections.

Table I below summarizes the terms of harmonics that produce systematic error in the frequency domain. Note the presence of zeroes in Table 1, which denote cancellation (or at least substantial reduction) of bias arising from high order harmonics.

TABLE 1

| Phase shifts N | Phase step $2\pi/N$ | Wanted Harmonic 1 | Number of high order harmonics causing error<br>Harmonics error canceled by present invention denoted [0]<br>Harmonics still producing error denoted [X] | | | | | | | | | | | | | |
|---|---|---|---|---|---|---|---|---|---|---|---|---|---|---|---|---|
| | | | 2 | 3 | 4 | 5 | 6 | 7 | 8 | 9 | 10 | 11 | 12 | 13 | 14 | 15 |
| 3 | $2\pi/3$ | X | X | 0 | X | X | 0 | X | X | 0 | X | X | 0 | X | X | 0 | |
| 4 | $2\pi/4$ | X | 0 | X | 0 | X | 0 | X | 0 | X | 0 | X | 0 | X | 0 | X | |
| 5 | $2\pi/5$ | X | 0 | 0 | X | 0 | X | 0 | 0 | X | 0 | X | 0 | 0 | X | 0 | |
| 6 | $2\pi/6$ | X | 0 | 0 | 0 | X | 0 | X | 0 | 0 | 0 | X | 0 | X | 0 | 0 | |
| 7 | $2\pi/7$ | x | 0 | 0 | 0 | 0 | X | 0 | X | 0 | 0 | 0 | 0 | X | 0 | X | |
| 8 | $2\pi/8$ | X | 0 | 0 | 0 | 0 | 0 | X | 0 | X | 0 | 0 | 0 | 0 | 0 | X | |
| 9 | $2\pi/9$ | X | 0 | 0 | 0 | 0 | 0 | 0 | X | 0 | X | 0 | 0 | 0 | 0 | 0 | |
| 10 | $2\pi/10$ | X | 0 | 0 | 0 | 0 | 0 | 0 | 0 | X | 0 | X | 0 | 0 | 0 | 0 | |
| 11 | $2\pi/11$ | X | 0 | 0 | 0 | 0 | 0 | 0 | 0 | 0 | X | 0 | X | 0 | 0 | 0 | |
| ... | ... | X | ... | | | | | | | | | | | | | | |
| N | $2\pi/N$ | X | ... | | | | | | | | | | | | | | |
| N + 1 | $2\pi/N = N$'s | X | ... | | | | | | | | | | | | | | |

Referring to Table 1, for N=4 phase-shifting, note that the third order harmonics are essentially reduced to zero by the present invention, and will substantially reduce TOF systematic error. When N=8 phase-shifting, the high order harmonics of terms [2, 3, 4, 5, 6, 7, 8, 10, 11, 12, 113, 114, . . . ] will not produce systematic error, even if these terms are large or varying in magnitude with different environmental and other conditions.

Table 2, following, depicts operation of TOF system 200' in the above-described variable gain mode, variable integration time mode, and digital operation.

higher modulation contrast but undesirable for the attendant high order harmonics. However bias error due to the high order harmonics is reduced according the present invention.

Equally distributed N-phase shifts with $2\pi$ may be applied either within a single period of the (CF) correlation function, or may be applied over more than a single period, e.g., N+k, k+1, 2, . . . . Embodiments implementing this method allow for maximum modulation contrast with minimal harmonics, factors that are not readily if at all achievable using prior art methods.

TABLE 2

| | | Term | 1 | 2 | 3 | 4 | 5 | 6 | 7 | 8 | 9 | 10 | 11 |
|---|---|---|---|---|---|---|---|---|---|---|---|---|---|
| 3 | $2\pi/3$ | Sin | 0 | −0.866 | 0.866 | | | | | | | | |
| | | Cos | 1 | −.5 | −0.5 | | | | | | | | |
| 4 | $2\pi/4$ | Sin | 0 | −1 | 0 | 1 | | | | | | | |
| | | Cos | 1 | 0 | −1 | 0 | | | | | | | |
| 5 | $2\pi/5$ | Sin | 0 | −0.951 | −0.588 | 0.588 | 0.951 | | | | | | |
| | | Cos | 1 | 0.309 | −0.809 | −0.809 | 0.309 | | | | | | |
| 6 | $2\pi/6$ | Sin | 0 | −0.866 | −0.866 | 0 | 0.866 | 0.866 | | | | | |
| | | Cos | 1 | 0.5 | −0.5 | 1 | −0.5 | 0.5 | | | | | |
| 7 | $2\pi/7$ | Sin | 0 | −0.782 | −0.975 | −0.433 | 0.433 | 0.975 | 0.782 | | | | |
| | | Cos | 1 | 0.623 | −0.223 | −0.901 | −0.901 | −0.223 | 0.623 | | | | |
| 8 | $2\pi/8$ | Sin | 0 | −0.707 | −1 | −0.707 | 0 | 0.707 | 1 | 0.707 | | | |
| | | Cos | 1 | 0.707 | 0 | −0.707 | −1 | −0.707 | 0 | 0.707 | | | |
| 9 | $2\pi/9$ | Sin | 0 | −0.643 | −0.985 | −0.866 | −0.342 | 0.342 | 0.866 | 0.985 | 0.643 | | |
| | | Cos | 1 | 0.766 | 0.174 | −0.5 | −0.94 | −0.94 | −0.5 | 0.174 | 0.766 | | |
| 10 | $2\pi/10$ | Sin | 0 | −0.588 | −0.951 | −0.951 | 0.588 | 0 | 0.588 | 0.951 | 0.951 | 0.588 | |
| | | Cos | 1 | 0.809 | 0.309 | −0.309 | −0.809 | −1 | −0.809 | −0.309 | 0.309 | 0.809 | |
| 11 | $2\pi/11$ | Sin | 0 | −0.541 | −0.91 | −0.99 | −0.756 | −0.282 | 0.282 | 0.756 | 0.99 | 0.91 | 0.541 |
| | | Cos | 1 | 0.841 | 0.415 | −0.142 | −0.655 | −0.959 | −0.959 | −0.655 | −0.142 | 0.415 | 0.841 |

Note that N, the number of phase shifts, may be any integer, and that the initial or first phase shift may be any phase value. When N is an odd integer, there is high resistance, e.g., reduction, for very high order harmonics in a TOF system operating with square-wave signals. On the other hand, using an even number of N-phase shifts will have less reduction upon higher order odd harmonics in a TOF system operating with square-wave signals.

As noted there exists a design tradeoff between use of a square-wave shaped TOF system optical emitted waveform and high modulation contrast, and use of a perhaps triangular-shaped waveform that yields a lower modulation contrast but whose rise and fall times are not as rich in undesired high order harmonics. The present invention advantageously provides the best of both worlds. The TOF system emits waveforms with fast rise and fall transition times, desirable for Advantageously TOF system thermal effects are substantially reduced with the substantial reduction of high order odd harmonics, according to the present invention. Because the method is dynamically self-calibrating, calibration is robust despite environment temperature changes and variations in system components within the TOF system, over the life of the system. Prior art use of static LUT(s) with calibration data determined a priori simply cannot provide consistently good calibration data, especially when optical energy and pixel detector waveforms change during runtime operation. Within a fixed distance and frame rate, embodiments of the present invention advantageously enhance dynamic range with increasing the N phase shifts.

As noted, uniformity is enhanced by virtue of the asymmetry associated with use of an odd number of phases. Advantageously, this asymmetry has the desired effect of reducing saturation of pixels or saturation of their associated analog/digital converters. In practice, the rate at which error increases vs. saturation is less than if the TOF system were operated with a conventional four-phase method. Thus, error due to harmonics, which has long plagued prior art calibration approaches, is now reduced. Active intensity information (pixel response to TOF system active or emitted optical energy) is typically used for filtering in many TOF systems. Yet typical TOF systems have harmonic error in their active intensity data as well. Advantageously, the present invention reduces error in active intensity harmonics, which results in less error when filtering is applied to the TOF system. Having described advantages of the present invention, some actual data acquired using various phase shifts will now be described.

Figure 3A:
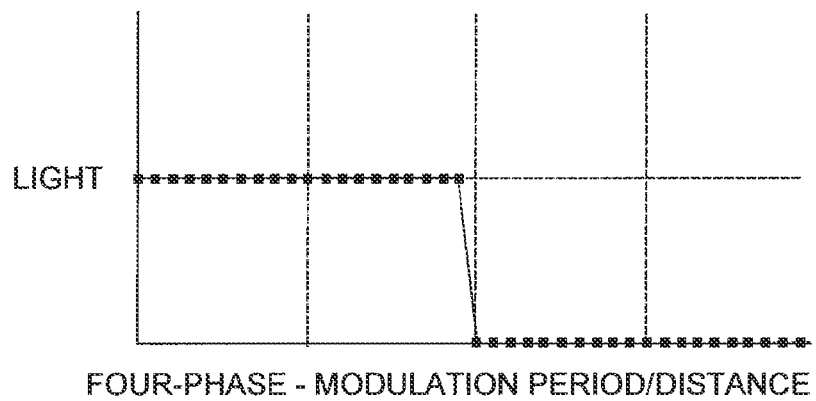
FIGS. 3A, 3B, 3C depict light input, pixel or detector A output, and pixel or detector B output vs. modulation period/distance for a four-phase operated TOF system, according to embodiments of the present invention.
Figure 3B:
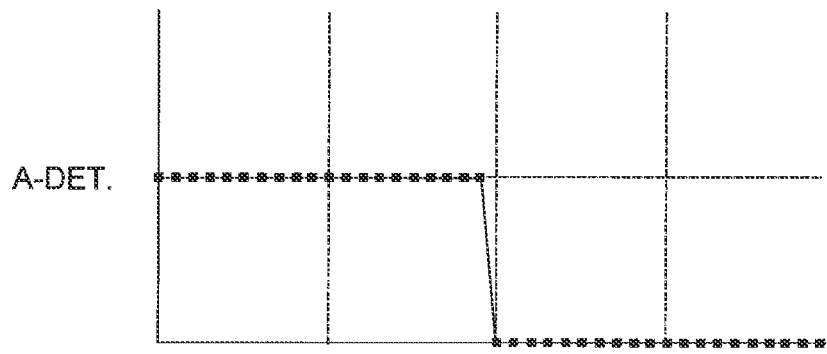
Figure 3C:
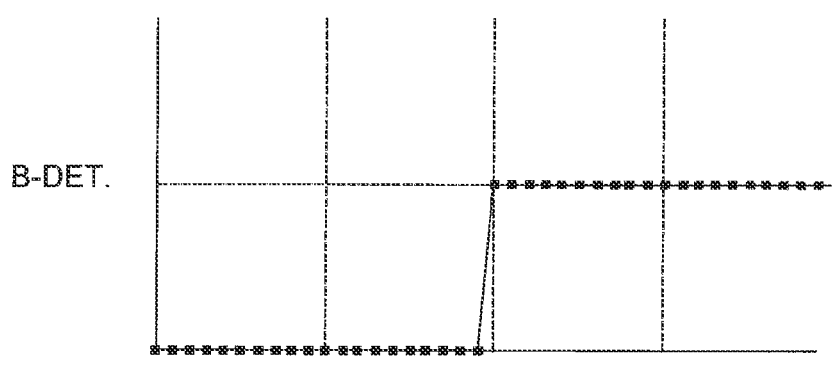
Figure 3D:
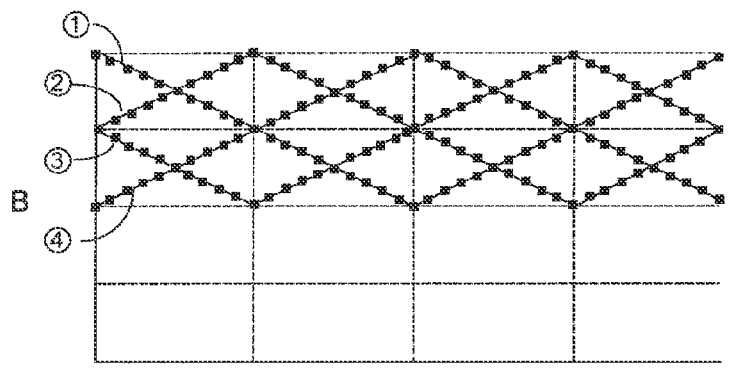
FIGS. 3D and 3E depict detector B and differential detector (A-B) output vs. modulation period/distance for a four-phase operated TOF system, according to embodiments of the present invention.
Figure 3E:
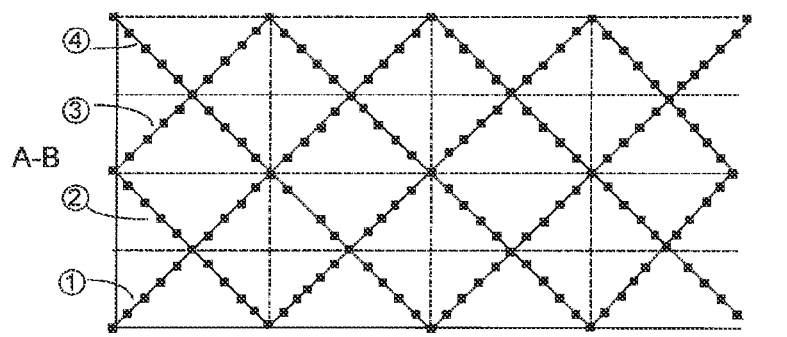
Figure 3F:
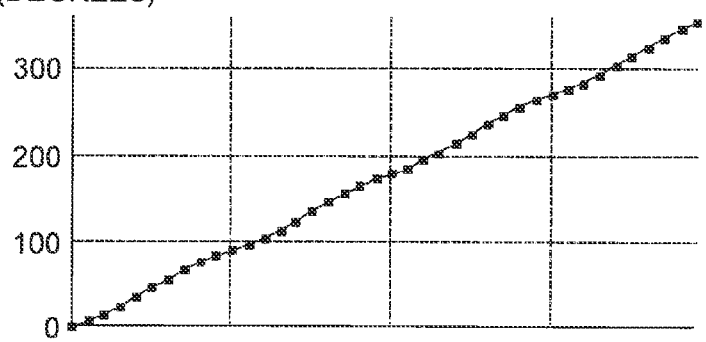
FIG. 3F depicts phase vs. modulation period/distance for a four-phase operated TOF system, according to embodiments of the present invention.

FIGS. 3A-3I depict TOF system 200' operating in four-phase mode (N=4). FIG. 3A depicts idealized incoming optical energy, and FIGS. 3B and 3C depict output of a detector in pixel bank A and output of a detector in pixel bank B. Details of pixel detection may be found in the various Canesta, Inc. now Microsoft, Inc. patents referenced herein, and will not be repeated here. FIG. 3D is a plot of four phase data versus modulation period/distance for a detector B, while FIG. 3E depicts differential (A−B) detector data versus modulation period/distance. The encircled numerals denote the four phases. FIG. 3F depicts phase vs. modulation period/distance and shows some undesired ripple and non-linearity on the transfer function.

Figure 3G:
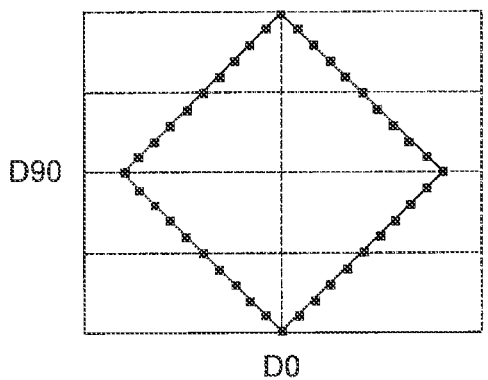
FIG. 3G is a polar plot showing four phase harmonics, according to embodiments of the present invention.
Figure 3H:
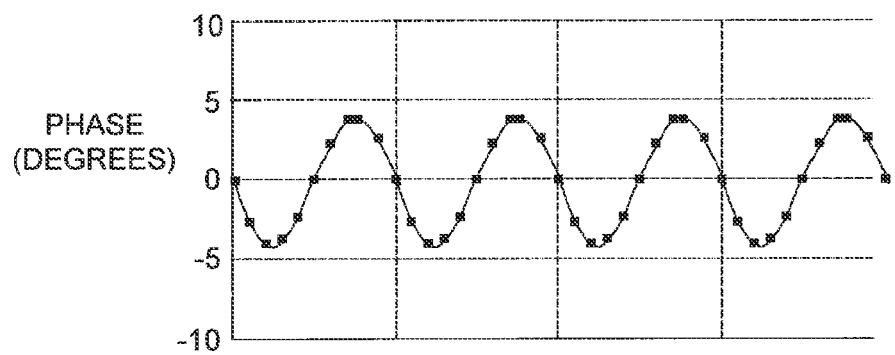
FIG. 3H depicts phase vs. modulation period/distance for four phase harmonics, according to embodiments of the present invention.
Figure 3I:
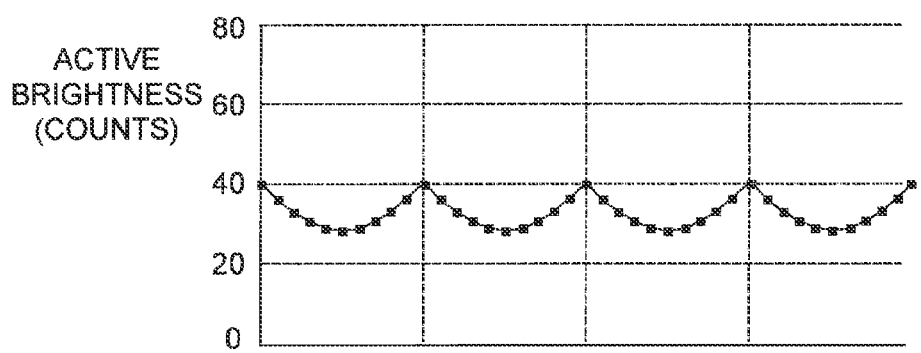
FIG. 3I depicts active brightness vs. modulation period/distance for four phase harmonics, according to embodiments of the present invention.
Figure 4A:
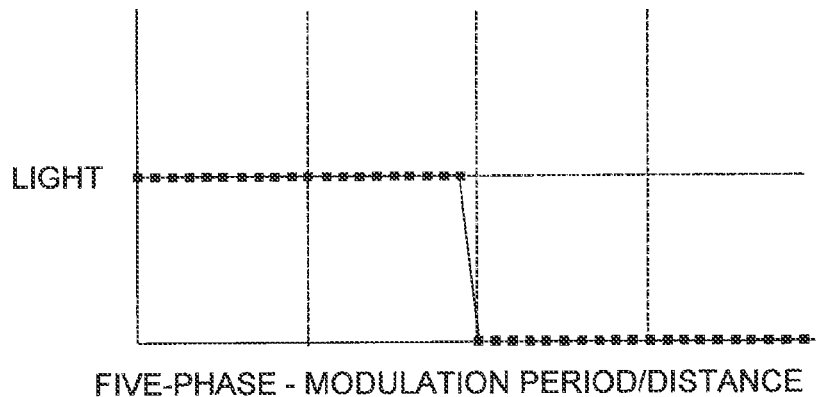
FIGS. 4A, 4B, and 4C depict light input, pixel or detector A output, and pixel or detector B output vs. modulation period/distance for a five-phase operated TOF system, according to embodiments of the present invention.
Figure 4B:
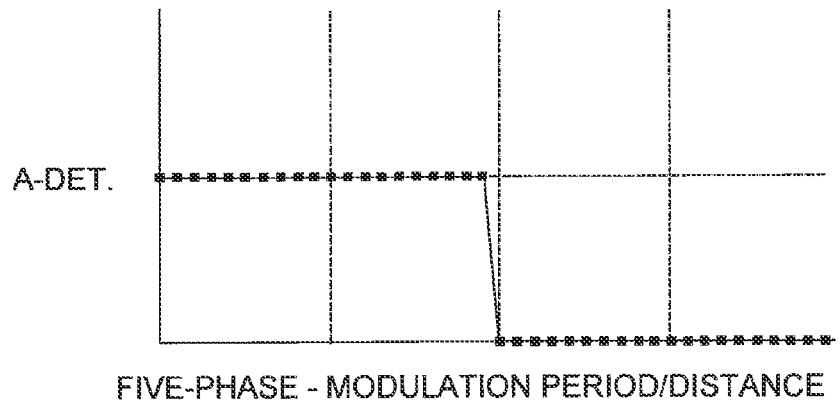
Figure 4C:
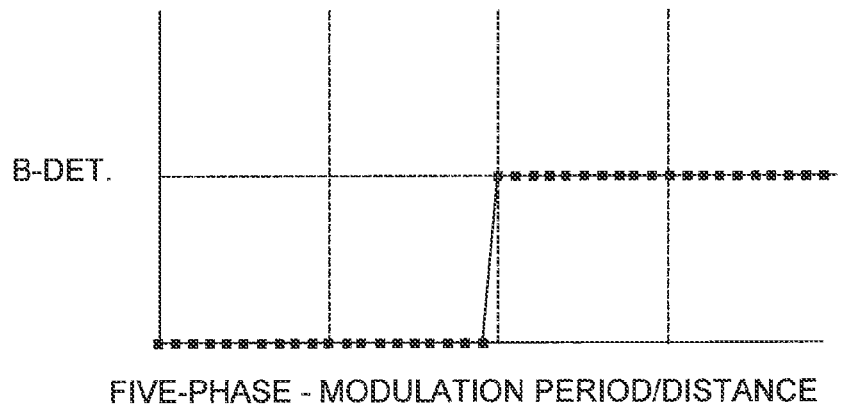
Figure 4D:
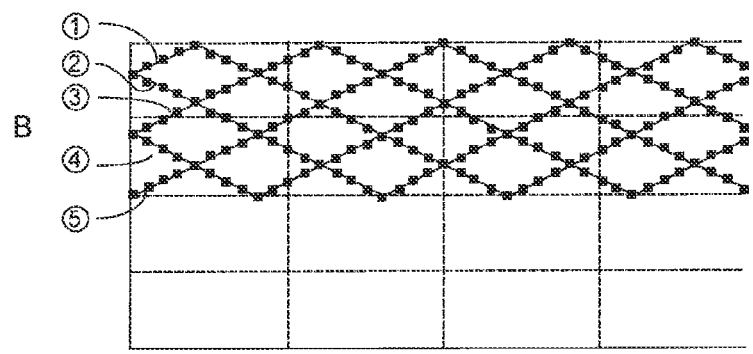
FIGS. 4D and 4E depict detector B and differential detector (A-B) output vs. modulation period/distance for a five-phase operated TOF system, according to embodiments of the present invention.
Figure 4E:
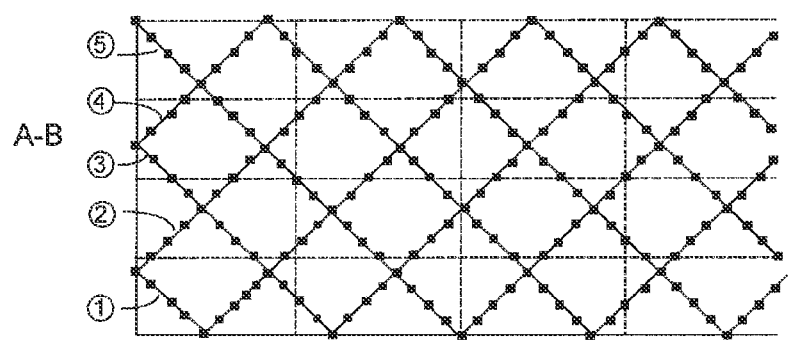
Figure 4F:
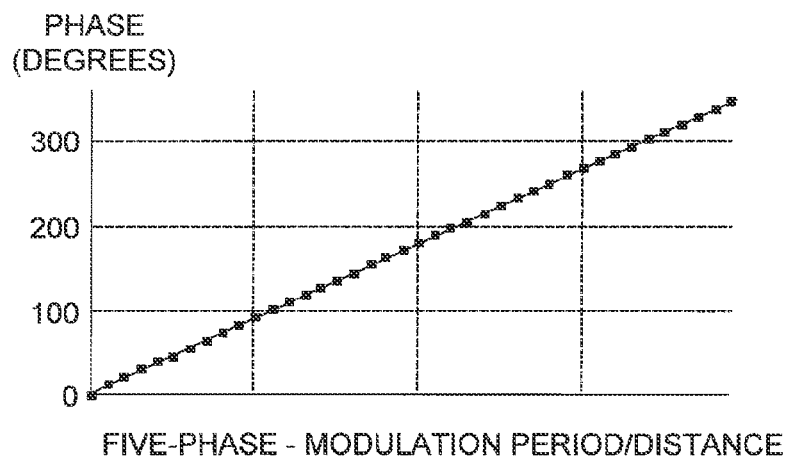
FIG. 4F depicts phase vs. modulation period/distance for a five-phase operated TOF system, according to embodiments of the present invention.
Figure 4G:
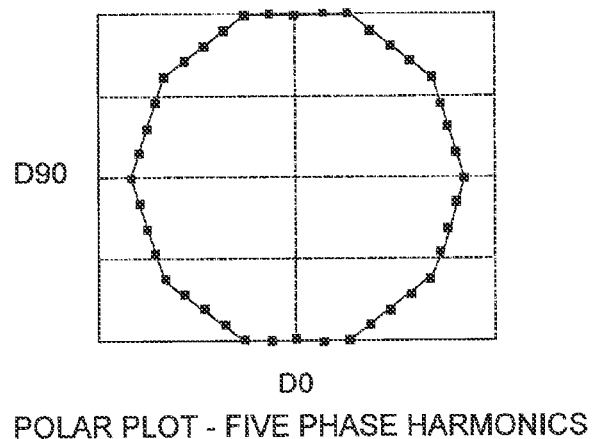
FIG. 4G is a polar plot showing five phase harmonics, according to embodiments of the present invention.
Figure 4H:
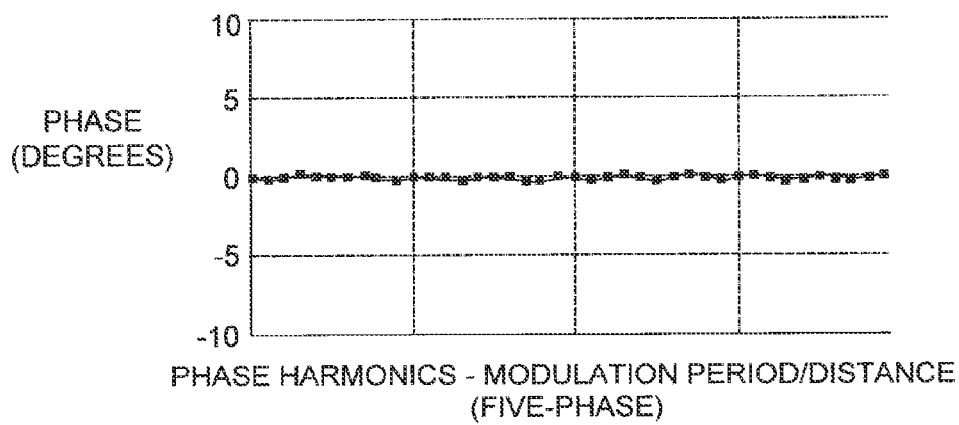
FIG. 4H depicts phase vs. modulation period/distance for five phase harmonics, according to embodiments of the present invention.
Figure 4I:
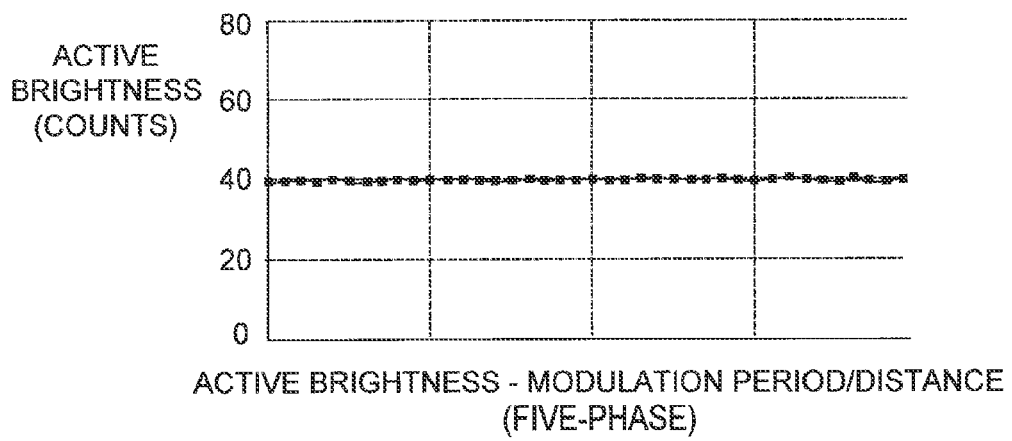
FIG. 4I depicts active brightness vs. modulation period/distance for five phase harmonics, according to embodiments of the present invention.

FIG. 3G is a polar plot of the harmonics for four-phase operation, while FIG. 3H depicts four phase harmonics versus modulation period/distance. FIG. 3I depicts active brightness (e.g., response to optical energy emitted by 120 as opposed to response to other, e.g., ambient, optical energy) versus modulation period/distance.

FIGS. 4A-4I depict similar plots for a five-phase operation. Note the enhanced linearity of the five-phase vs. modulation period/distance transfer function in FIG. 4F, especially in comparison to the harmonic-distorted four-phase transfer function of FIG. 3F. Similarly there is relatively little perturbation on the data plotted in FIGS. 4H and 4I.

Figure 5A:
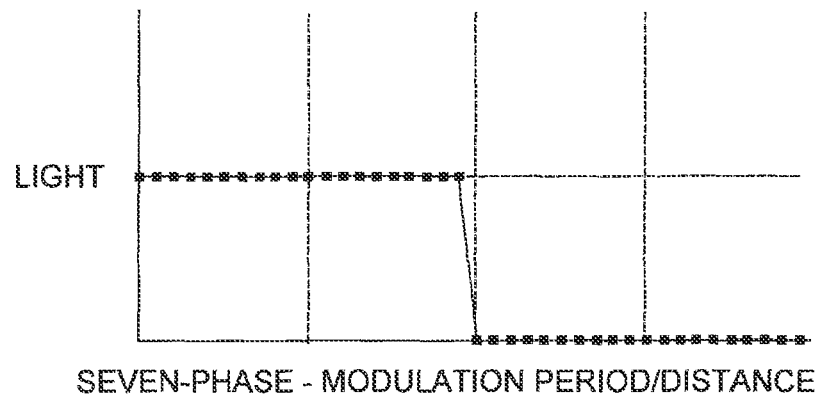
FIGS. 5A, 5B, and 5C depict light input, pixel or detector A output, and pixel or detector B output vs. modulation period/distance for a seven-phase operated TOF system, according to embodiments of the present invention.
Figure 5B:
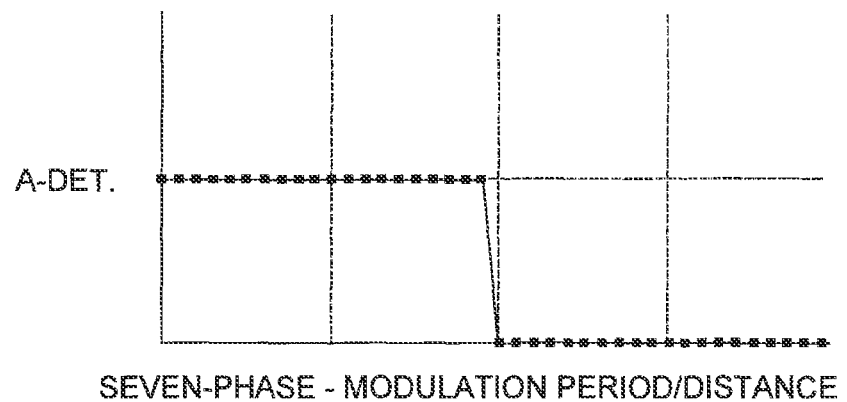
Figure 5C:
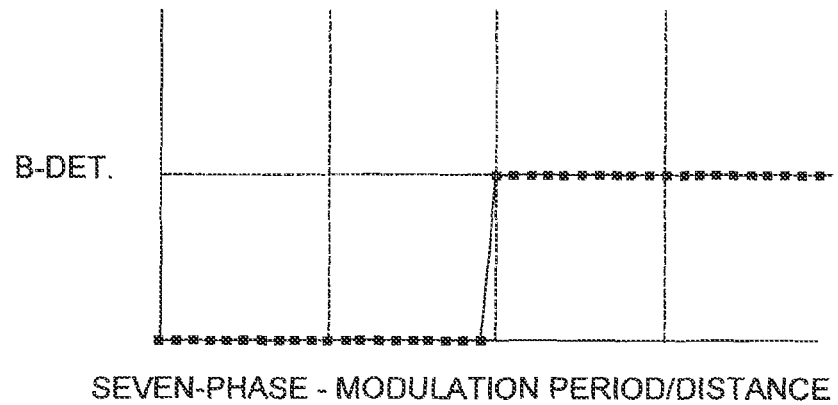
Figure 5D:
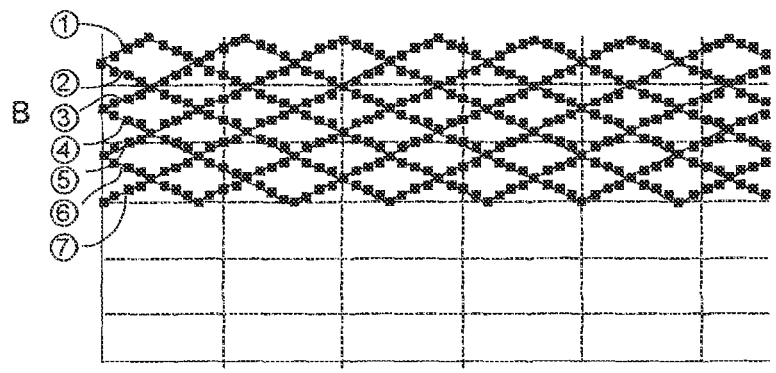
FIGS. 5D and 5E depict detector B and differential detector (A-B) output vs. modulation period/distance for a seven-phase operated TOF system, according to embodiments of the present invention.
Figure 5E:
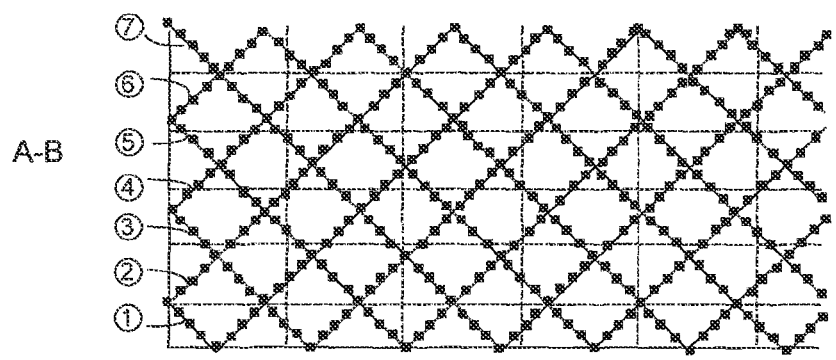
Figure 5F:
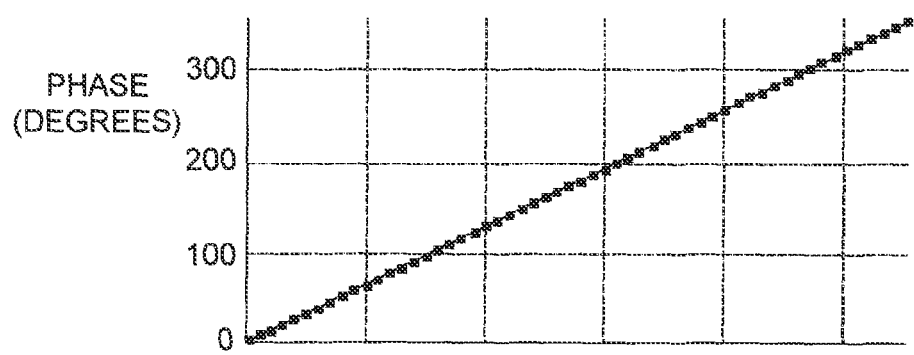
FIG. 5F depicts phase vs. modulation period/distance for a seven-phase operated TOF system, according to embodiments of the present invention.
Figure 5G:
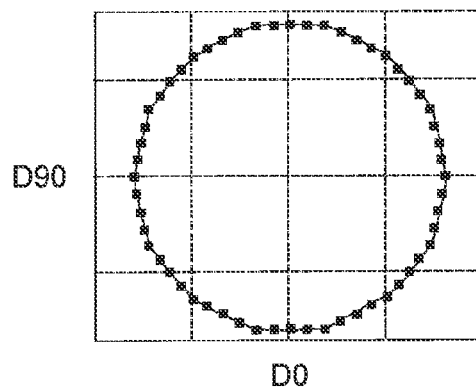
FIG. 5G is a polar plot showing seven phase harmonics, according to embodiments of the present invention.
Figure 5H:
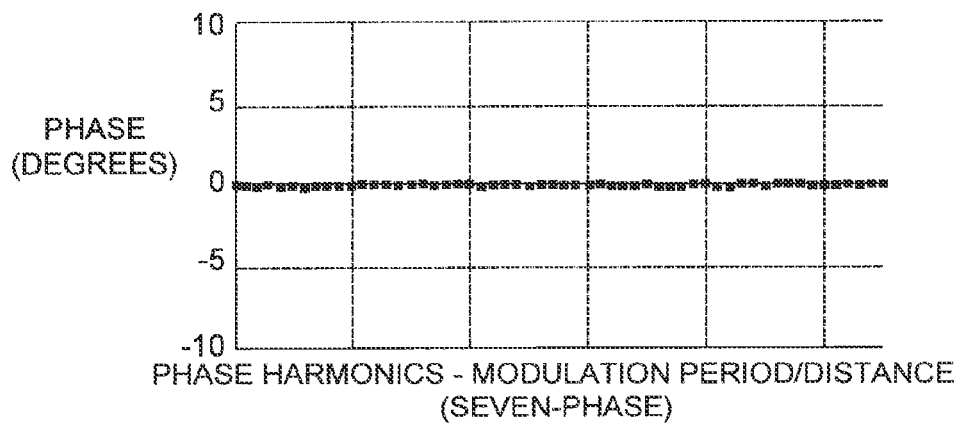
FIG. 5H depicts phase vs. modulation period/distance for seven phase harmonics, according to embodiments of the present invention.
Figure 5I:
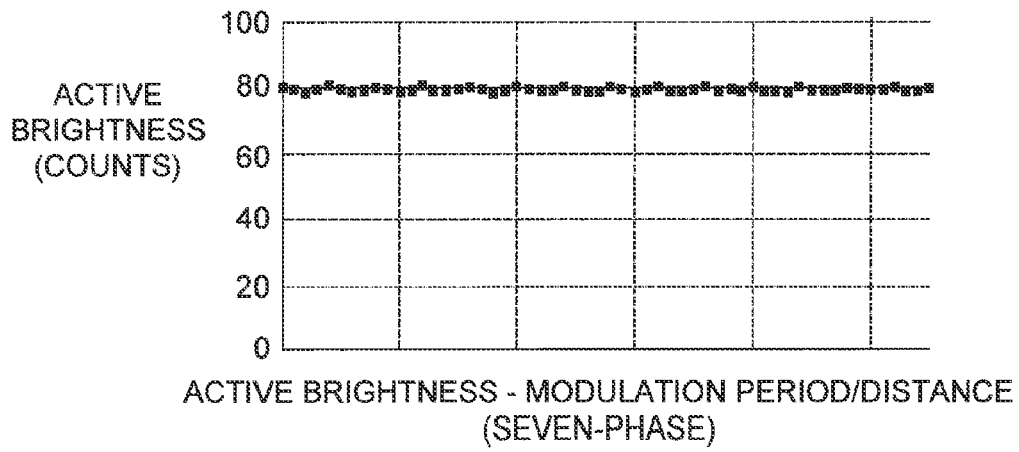
FIG. 5I depicts active brightness vs. modulation period/distance for seven phase harmonics, according to embodiments of the present invention.

FIGS. 5A-5I depict similar plots for a seven-phase operation. The transfer function of phase vs. modulation period/distance shown in FIG. 5F is very linear. Similarly there is little perturbation on the data shown in FIGS. 5H and 5I for the seven-phase operation. The high linearity of these transfer functions is advantageously improved over the harmonic-distorted transfer function of FIG. 4F. Clearly an odd number of phases is preferred to use of an even number of phases.

While the various embodiments have been described with reference to the receiving channel or functionality of a TOF system, it is understood that implementation may be on the optical emitting channel instead. In either implementation, the present invention provides a self-calibrating method of substantially reducing systemic error caused by higher order harmonics in a phase-based TOF system. Advantageously good modulation contrast performance is retained, while simultaneously reducing systemic error.

Any integer number N of phase shifts may be used, and the initial phase shift may be any value. However it can be advantageous to use an odd number of phase shifts as higher order harmonic perturbations are reduced, even when operating the TOF system with square-waves. An odd number of phases presents a higher load on the TOF system but reduces the effect of higher order harmonics. By contrast, operating with an even number of phases presents a lighter system load but with less effective elimination of higher order harmonics. Independent of magnitude of N, two memory banks will suffice to store calibration data. The N phase shifting steps may be implemented within the TOF system transmission channel or receiving channel. In either implementation, system error including thermal effects is substantially reduced.

Various embodiments of the present invention enable system 200' to achieve higher levels of modulation contrast, e.g., 70%, than prior art phase-based TOF systems, while achieving self-calibration to reduce higher order of harmonics, without increase in noise. Advantageously, the present invention is robust and dynamic. Further, given a fixed Z distance frame rate of data acquisition, the present invention provides increased dynamic range with less likelihood of blurring due to a moving target object, since increasing N means data are acquired in more, but shorter, time increments. Use of an odd number of phases further makes it less likely to saturate devices and systems, including analog/digital conversion units. Advantageously, active intensity information acquired by the TOF system also benefits from the present invention, as do corrective methods that use active intensity information.

Modifications and variations may be made to the disclosed embodiments without departing from the subject and spirit of the invention as defined by the following claims.

What is claimed is:

1. A method of self-calibrating a time-of-flight (TOF) system to reduce error, the TOF system emitting optical energy of a known modulation frequency phase, detecting a portion of said optical energy reflected from a target object a distance Z away using an array of pixels, and determining depth Z by examining phase shift in detected reflected optical energy relative to phase of emitted said optical energy, the method comprising the following steps:
   (a) acquiring detection data from said array of pixels using a number N of acquisitions, wherein N is selected from a group consisting of (i) even integers, and (ii) odd integers;
   (b) causing said TOF system to operate during runtime in a mode selected from a group consisting of (i) detection gain modification mode, (ii) detection integration time modification mode, and (iii) digital value modification mode, wherein a selected said mode provides self-calibration data for said TOF system;
   (c) storing self-calibration data obtained during one said mode in a first and second memory location; and
   (d) using stored said self-calibration data during runtime operation of said TOF system to reduce calibration error;
   wherein said method reduces at least one of (i) bias error due to higher order harmonics, (ii) bias error due to variation in wave-shape of optical energy emitted by said TOF system, and (iii) bias errors due to variations in waveforms received by said pixels in said array.

2. The method of claim 1, wherein at step (a) at least three acquisitions are used.

3. The method of claim 1, wherein step (b) is carried out dynamically during runtime operation of said TOF system.

4. The method of claim 1, wherein step (b) provides a single said mode.

5. The method of claim 1, wherein at step (b) during runtime said TOF system operates in detection gain modification mode wherein at least one of (i) quantum efficiency modulation, and (ii) homodyne detection is implemented within said TOF system.

6. The method of claim 5, wherein gain of TOF system demodulated signals is modified on a per-phase change basis, and gain modified said demodulated signals are digitized and stored in at least first and second memory banks.

7. The method of claim 1, wherein at step (b) during runtime said TOF system operates in detection integration time modification mode wherein at least one of (i) quantum efficiency modulation, and (ii) homodyne detection is implemented within said TOF system.

8. The method of claim 7, wherein at step (b) TOF system demodulated pixel detection signal integration times are modified synchronously on a per-phase change basis, and demodulated pixel detection signals are then digitized and stored in at least first and second memory banks.

9. The method of claim 1, wherein at step (b) during runtime said TOF system operates in digital value modification mode wherein at least one of (i) quantum efficiency modulation, and (ii) homodyne detection is implemented within said TOF system.

10. The method of claim 9, wherein at step (b) TOF system demodulated pixel detection signals are associated on a per-phase change with pre-stored digital numerical values.

11. The method of claim 1, wherein at step (c), self-calibration data is storable in two banks of storage, location of said two banks of storage being selected from a group consisting of (i) internal to said TOF system, and (ii) external to said TOF system.

12. The method of claim 1, wherein phase shift has at least one characteristic selected from a group consisting of (i) phase shifts are substantially equal to each other, and (ii) phase shifts are distributed relative to each other at least non-equal distances over a period of an associated correlation factor.

13. A time-of-flight (TOF) system of the type that emits optical energy of a known modulation frequency phase, detects a portion of said optical energy reflected from a target object a distance Z away using an array of pixels, and determines depth Z by examining phase shift in detected reflected optical energy relative to phase of emitted said optical energy, the TOF system including:
    means for acquiring detection data from said array of pixels using an number N of acquisitions, wherein N is selected from a group consisting of (a) even integers, and (b) odd integers;
    means for causing said TOF system to operate during runtime in a mode selected from a group consisting of (i) detection gain modification mode, (ii) detection integration time modification mode, and (iii) digital value modification mode, wherein a selected said mode provides self-calibration data for said TOF system;
    memory to store self-calibration data obtained during one said mode in a first and second memory location; and
    means for using stored said self-calibration data during runtime operation of said TOF system to reduce calibration error;
    wherein said TOF system exhibits reduced bias error of at least one type selected from a group consisting of (i) bias error due to higher order harmonics, (ii) bias error due to variation in wave-shape of optical energy emitted by said TOF system, and (iii) bias errors due to variations in waveforms received by said pixels in said array.

14. The system of claim 13, wherein self-calibration data is obtained dynamically during runtime operation of said TOF system.

15. The system of claim 13, wherein said TOF system operates in detection gain modification mode, and is implemented using at least one of (i) quantum efficiency modulation, and (ii) homodyne detection.

16. The system of claim 15, wherein gain of said TOF system demodulated signals is modified on a per-phase change basis; further including means for digitizing and storing in at least first and second memory banks gain modified said demodulated signals.

17. The system of claim 13, wherein during runtime said TOF system operates in detection integration time modification mode, and is implemented using at least one of (i) quantum efficiency modulation, and (ii) homodyne detection.

18. The system of claim 17, wherein TOF system demodulated pixel detection signal integration times are modified synchronously on a per-phase change basis; further including mans for digitizing and storing in at least first and second memory banks demodulated pixel detection signals.

19. The system of claim 13, wherein said TOF system operates in digital value modification mode, and is implemented using at least one of (i) quantum efficiency modulation, and (ii) homodyne detection.

20. The system of claim 19, further including memory storing digital numerical values associated on a per-phase change with TOF system demodulated pixel detection signals.

21. The system of claim 13, further including a first bank of memory and a second bank of memory, said first and said second bank of memory disposed in a location selected from a group consisting of (i) internal to said TOF system, and (ii) external to said TOF system.

22. The system of claim 13, wherein phase shift has at least one characteristic selected from a group consisting of (i) phase shifts are substantially equal to each other, and (ii) phase shifts are distributed relative to each other at least non-equal distances over a period of an associated correlation factor.

* * * * *